Figure 1:
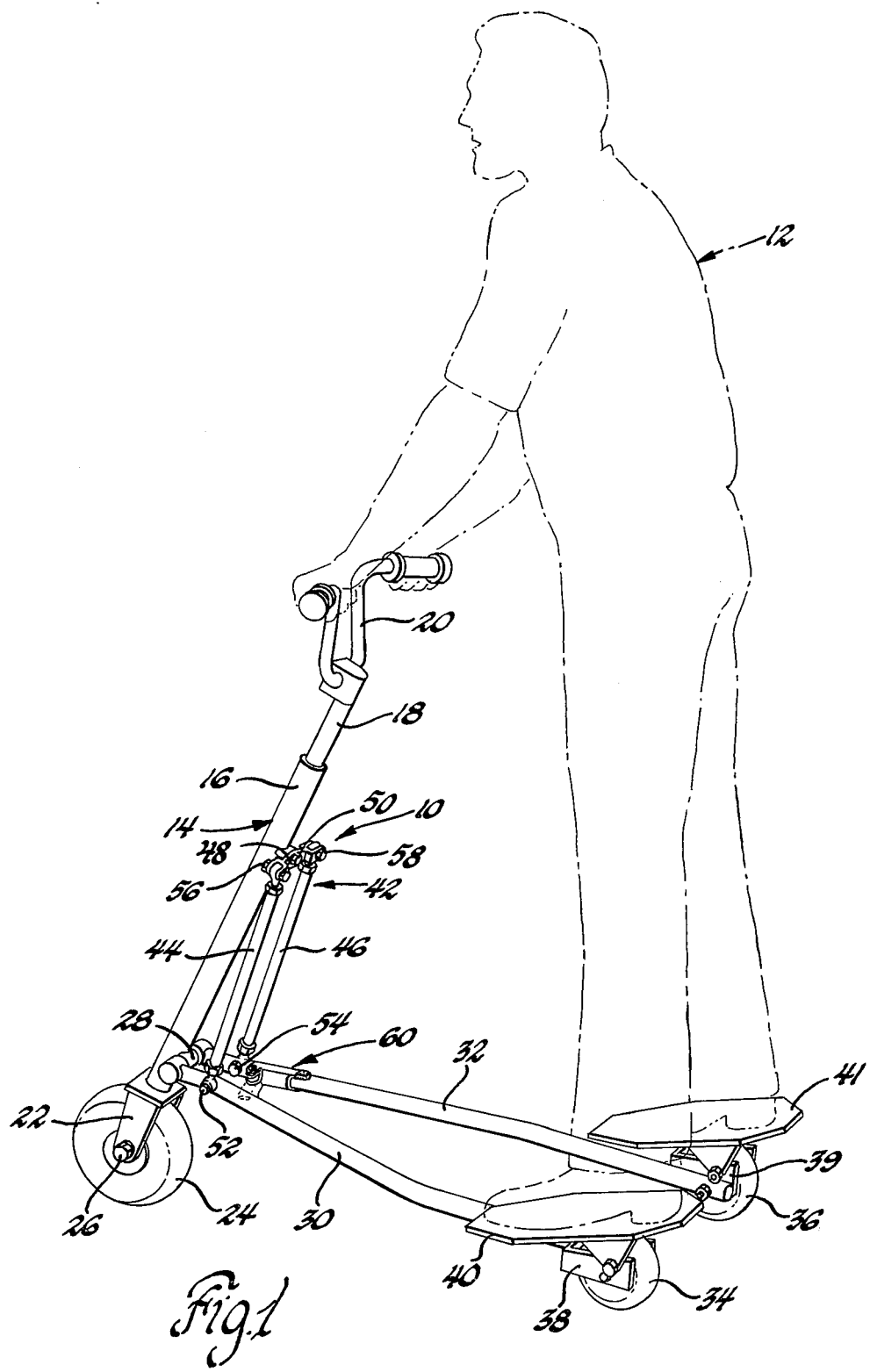

United States Patent [19]

Winchell

[11] 4,071,261

[45] Jan. 31, 1978

[54] LOCK BAR FOR CAMBERING VEHICLE

[75] Inventor: Frank J. Winchell, Orchard Lake, Mich.

[73] Assignee: General Motors Corporation, Detroit, Mich.

[21] Appl. No.: 728,723

[22] Filed: Oct. 1, 1976

[51] Int. Cl.² ............................................... B62K 5/02
[52] U.S. Cl. ..................................... 280/220; 280/218; 280/282; 280/301
[58] Field of Search ........... 280/293, 296, 301, 112 R, 280/112 A, 113, 282, 283, 200, 210, 218, 220, 221, 224, 233, 87 R, 87.04 R, 87.04 A, 87.1, 6.11, 21 R, 21 A, 14, 15, 16, 17, 12.1, 12 H; 180/25 R, 26 R

[56] References Cited

U.S. PATENT DOCUMENTS

| 2,319,066 | 5/1943 | Klatt et al. | 280/301 |
| 2,593,974 | 4/1952 | Brown | 280/21 R |
| 2,835,499 | 5/1958 | Andren et al. | 280/293 |
| 3,033,585 | 5/1962 | Marston et al. | 280/12.1 X |
| 3,910,603 | 10/1975 | Shipman | 280/293 |
| 3,964,563 | 6/1976 | Allen | 180/41 |

FOREIGN PATENT DOCUMENTS 4,942,586  11/1974  Japan ............................ 280/112 A Primary Examiner—Kenneth H. Betts
Attorney, Agent, or Firm—Edward J. Biskup

[57] ABSTRACT

A cambering vehicle having a steering frame which pivotally supports a pair of trailing arms with one of the trailing arms being provided with a lock bar that is movable from a stored position into a position wherein the free end of the bar is connected to the other trailing arm so as to prevent relative movement of the trailing arms and thereby permit the vehicle to be parked.

4 Claims, 3 Drawing Figures

U.S. Patent Jan. 31, 1978 Sheet 1 of 2 4,071,261

LOCK BAR FOR CAMBERING VEHICLE

The invention relates to cambering vehicles having pivotally supported trailing arms and more particularly concerns a locking arrangement for preventing relative movement of the trailing arms when the vehicle is parked.

My copending application Ser. No. 649,967 filed on Jan. 19, 1976 entitled "Cambering Vehicle" and assigned to the assignee of this invention discloses a three point contact vehicle having an upright steering frame which supports a dirigible front surface contact member at a fixed caster angle. A pair of laterally spaced trailing arms are pivotally connected to a lower portion of the steering frame and are interconnected through a bell crank linkage which allows equal and opposite pivotal movement of the trailing arms. With this arrangement, camber steering can be realized as well as slip angle steering used in conventional multi-wheeled vehicles. In addition, the trailing arms provide support for the feet of the operator so that full use of the operators's body can be made for tilting the vehicle for increased maneuverability and stability.

The present invention is directed to a chambering vehicle of the above described type that is characterized in that it has a lock bar pivotally carried by one of the trailing arms for locking engagement with the other trailing arm so as to prevent relative movement thereof and thereby allow the vehicle to stand upright in a parked position without the assistance of the operator. More specifically, the vehicle according to the present invention, has a steering frame provided with an elongated steering shaft which is supported for turning movement and has a front wheel operatively connected to one end thereof. A manual steering device is connected to the other end of the steering shaft and the steering frame further includes a pair of elongated trailing arms which extend rearwardly and are provided with laterally spaced wheels which serve to engage a support surface. The forward ends of the trailing arms are connected to the steering frame by pivot means which extend laterally so as to allow the rear wheels to swing in separate planes and thereby allow the operator to roll the vehicle with respect to its roll axis and cause the trailing arms to move through equal distances in opposite directions. In addition, an elongated channel-shaped lock bar is pivotally connected to one of the trailing arms and has a portion thereof that is swingable into frictional engagement with the other of the trailing arms for preventing relative movement thereof.

The objects of the present invention are to provide a new and improved locking arrangement for the pivoted trailing arms of a cambering vehicle so as to allow the latter to be parked on a level surface; to provide a new and improved lock device for the pivoted trailing arms of a cambering vehicle in which the lock device includes a lock bar that is normally carried by one of the trailing arms and is swingable into engagement with the other trailing arm when the vehicle is to be parked; and to provide an improved locking arrangement for a cambering vehicle that has a channel-shaped lock bar which can be stored on one of the pivoted trailing arms when not in use and is movable in a substantially horizontal plane for connection with the other trailing arm so as to lock the trailing arms to each other and allow the vehicle to maintain an upright position.

Figure 2:
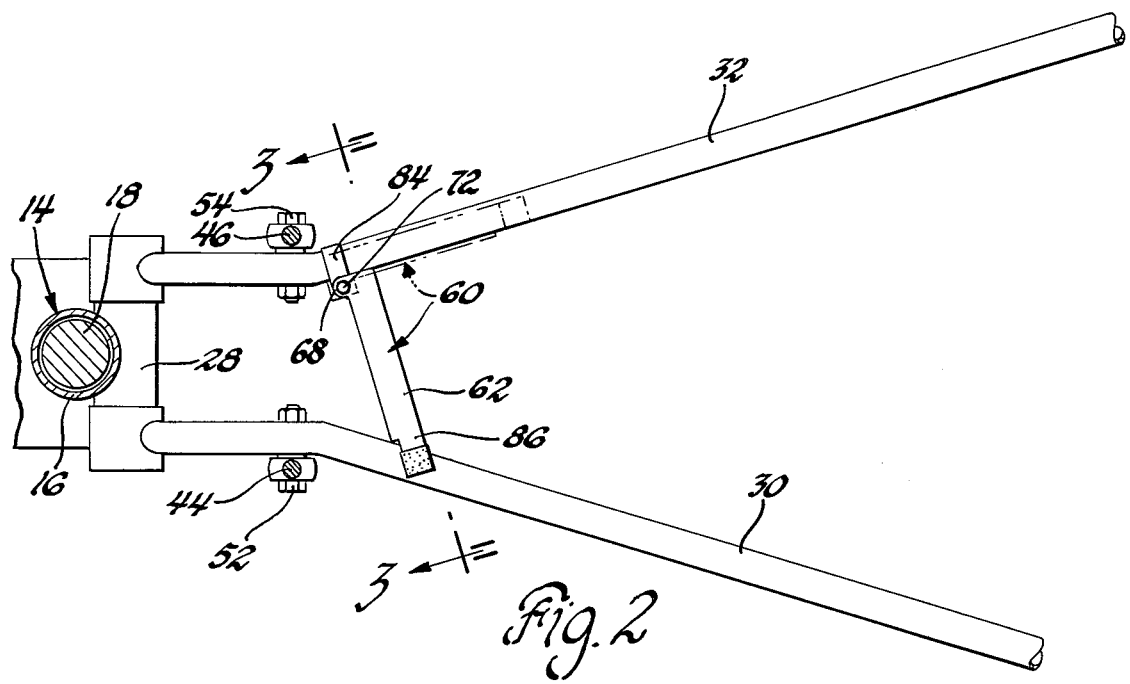
Figure 3:
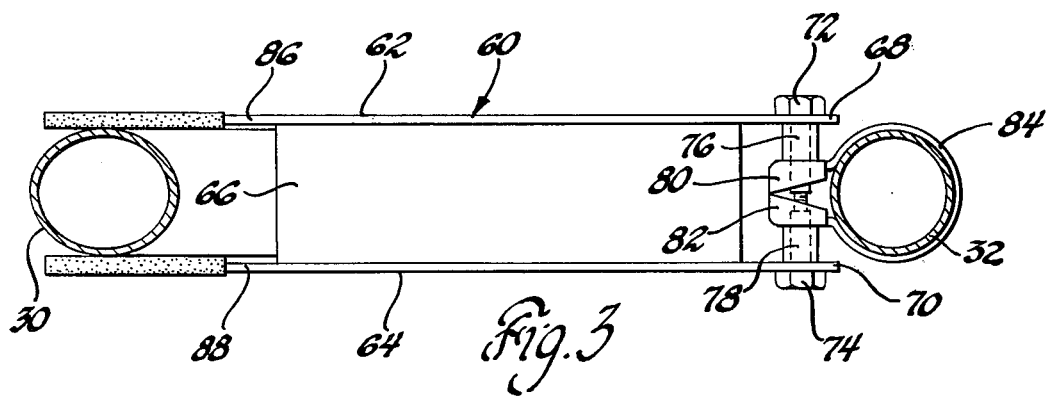

Other objects and advantages of the present invention will be more apparent from the following detailed description when taken with the drawings in which:

FIG. 1 is a perspective view showing a cambering vehicle incorporating a lock bar made in accordance with the invention, FIG. 2 is an enlarged plan view showing the trailing arms of the chambering vehicle locked from relative movement by the lock bar according to the invention, and FIG. 3 is a further enlarged view taken on lines 3—3 of FIG. 2.

Referring to FIG. 1 of the drawings, a cambering vehicle 10 is shown which is adapted to be propelled forwardly by the natural input of a vehicle operator 12 through the timed shifting of his weight from one foot to the other coordinated with the left and right cambered steering of the vehicle in a sinuous path. It will be noted that a vehicle of this type can be seen in the aforementioned copending patent application Ser. No. 649,967 filed on Jan. 19, 1976 and entitled "Cambering Vehicle" and reference is made to such application for a full understanding of how the vehicle is operated. It will also be noted that although a manually propelled vehicle is shown, an internal combustion engine or an electric motor can be combined with the vehicle for driving the front wheel thereof.

The chambering vehicle 10 comprises a steering frame 14 which includes a tubular column 16 which serves to axially align and rotatably support an elongated steering shaft 18 which extends therethrough. The upper end of the steering shaft 18 is provided with a handlebar assembly 20 while the lower end is formed with a fork 22 which supports a front surface contact member which in this instance takes the form of a rotatable wheel 24. The wheel 24 rotates on an axle 26 which extends transversely through and is supported by the fork 22. The lower end of the tubular column 16 is rigidly formed with a transverse shaft 28, the outer ends of which pivotally support the front ends of a pair of trailing arms 30 and 32 which extend rearwardly and terminate with rear surface contact members which take the form of wheels 34 and 36 supported for rotation by a pair of brackets 38 and 39, which in turn, pivotally support foot pads 40 and 41.

A cambering device 42 made according to the invention serves to interconnect the trailing arms 30 and 32 and ensures that the pivotal movement of the trailing arms 30 and 32 about shaft 28 is equal and opposite. Thus, when the vehicle 10 is leaned into a turn, all wheels remain in contact with the ground and camber by an amount equal to vehicle roll. More specifically, and as seen in FIG. 1, the chambering device includes a pair of links 44 and 46 and a bell crank 48 which is connected to the steering frame 14 by a longitudinally extending pivot bolt member 50. The lower ends of the links 44 and 46 are connected to the front portions of the trailing arms 30 and 32 by transversely extending pivot bolt members 52 and 54, respectively, while the upper ends of the links 44 and 46 are connected to the opposed ends of the bell crank 48 by longitudinally extending pivot bolt members 56 and 58, respectively.

As seen in FIGS. 2 and 3, the trailing arm 32 adjacent the lower end of the link 46 is provided with a lock bar 60 which is normally stored in the phantom line position and movable into the full line position for connection with the trailing arm 30. In this manner, the trailing arms 30 and 32 can be locked together so as to prevent any relative movement thereof about the shaft 28 and allow the vehicle to be parked on a level surface. More specifically, the lock bar 60 takes the form of an elongated channel member having upper and lower parallel walls 62 and 64 interconnected by a vertical wall 66. In other words, the lock bar 60 is U-shaped in cross section and has one end of the top and lower walls 62 and 64 formed with ear portions 68 and 70 provided with vertically aligned apertures which accommodate opposed bolt members 72 and 74. The bolt member 74 is formed with a threaded shank which is received within a threaded bore formed in the shank of the bolt member 72. The shanks of the bolt members 72 and 74 extend through sleeves 76 and 78 and the apertures formed in the eye portions 80 and 82 of a clamp 84 which serves to mount the lock bar 60 on the trailing arm 32. Thus, by tightening the bolt members 72 and 74, the clamp 84 is secured to the trailing arm 32. In addition, the bolt members 72 and 74 provide a pivot connection which allows the lock bar 60 to swing about the vertical axis of the bolt members from the phantom line position to the full line position as mentioned above.

The free end of the lock bar 60 has the upper and lower walls thereof extending outwardly and terminating with tab portions 86 and 88. Each of the tab portions 86 and 88 is covered with a resilient material such as rubber so when the lock bar 60 is in the full line position of FIGS. 2 and 3, the tab members 86 and 88 frictionally grip diametrically opposed surfaces of the trailing arm 30.

From the above description, it should be apparent that when the lock bar 60 is in the phantom line stored position of FIG. 2, the tab portions 86 and 88 engage the upper and lower peripheral surface of the trailing arm 32 to frictionally maintain the lock bar 60 on the trailing arm 32. During such time, the trailing arms 30 and 32 are movable relative to each other under the control of the chambering device 42. When it is desired to park the cambering vehicle 10, the operator merely swings the lock bar 60 in a clockwise direction as seen in FIG. 2 about the vertical pivot connection provided by the bolt members 72 and 74 so as to cause the trailing arm 30 to be located between the tab portions 86 and 88 and thereby lock trailing arm 32 to trailing arm 30 and prevent relative movement thereof.

The cambering vehicle 10 can also be placed in a parked condition by first leaning the steering frame 14 towards the left as seen FIG. 1 followed by swinging the lock bar 60 from the stored position to the extended full line position of FIGS. 2 and 3 so as to permit the tab portion 88 to contact the ground rather than engaging the trailing arm 30 as described above. The ground in such case serves as a support surface for the vehicle.

The cambering vehicle 10 would then be supported in an inclined attitude as seen in FIG. 4 of my aforementioned copending patent aplication Ser. No. 649,967 except leaning to the left rather than to the right, and the lock bar 60 would function somewhat in the manner of a kick-stand found on bicycles.

Various changes and modifications can be made in this construction without departing from the spirit of the invention. Such changes and modifications are contemplated by the inventor and he does not wish to be limited except by the scope of the appended claims.

I claim:

1. A three point contact cambering vehicle having a longitudinally extending roll axis comprising a steering frame, an elongated steering shaft mounted for turning movement in said steering frame, a steerable front contact means operatively connected to one end of said steering shaft for engagement with a support surface, a manual steering device operatively connected to the other end of said steering shaft, said steering frame further comprising a pair of elongated trailing arms extending rearwardly from said steering frame, laterally spaced rear contact means operatively connected to end portions of said trailing arms for engagement with the support surface, foot support means for an operator of the vehicle mounted on each of said trailing arms adjacent to each of said rear contact means, pivot means swingably mounting said trailing arms to said steering frame on an axis extending laterally thereof to permit said rear contact means to swing in separate planes allowing the operator to roll said vehicle with respect to said roll axis, a cambering device interconnecting said trailing arms so as to cause the latter to move through equal amounts in opposite directions so that the rear contact means camber by an amount equal to vehicle roll, and a lock bar pivotally connected adjacent one end thereof to one of said trailing arms and having a portion located adjacent the other end thereof that is normally maintained adjacent said one of said arms and is movable along an arc into engagement with the other of said trailing arms for preventing relative movement thereof.

2. A three point contact cambering vehicle having a longitudinally extending roll axis comprising a steering frame, an elongated steering shaft mounted for turning movement in said steering frame, a steerable front contact means operatively connected to one end of said steering shaft for engagement with a support surface, a manual steering device operatively connected to the other end of said steering shaft, said steering frame further comprising a pair of elongated trailing arms extending rearwardly from said steering frame, laterally spaced rear contact means operatively connected to end portions of said trailing arms for engagement with the support surface, foot support means for an operator of the vehicle mounted on each of said trailing arms adjacent to each of said rear contact means, pivot means swingably mounting said trailing arms to said steering frame on an axis extending laterally thereof to permit said rear contact means to swing in separate planes allowing the operator to roll said vehicle with respect to said roll axis, a cambering device including a pair of links and a bell crank interconnecting said trailing arms so as to cause the latter to move through equal amounts in opposite directions so that the rear contact means camber by an amount equal to vehicle roll, and a channel-shaped lock bar pivotally connected to one of said trailing arms, said lock bar being U-shaped in cross section and adapted to be maintained in a stored position by said one of said trailing arms, said lock bar having a portion movable into frictional engagement with the other of said trailing arms for preventing relative movement thereof.

3. A three wheel cambering vehicle having a longitudinally extending roll axis comprising a steering frame, an elongated steering shaft mounted for turning movement in said steering frame, a steerable front wheel rotatably connected to the lower end of said steering shaft, a handlebar assembly operatively connected to the upper end of said steering shaft, said steering frame further comprising a pair of elongated trailing arms extending rearwardly from said steering frame, laterally spaced rear wheels rotatably connected to end portions of said trailing arms, foot support means for an operator of the vehicle mounted on each of said trailing arms adjacent to each of said rear wheels, pivot means swingable mounting said trailing arms to said steering frame on an axis extending laterally thereof to permit said rear wheels to swing in separate planes allowing the operator to roll said vehicle with respect to said roll axis, a cambering device interconnecting said trailing arms so as to cause the latter to move through equal amounts in opposite directions so that the rear contact means camber by an amount equal to vehicle roll, and a channel-shaped lock bar connected to one of said trailing arms for pivotal movement about a vertical axis between a stored position and an extended position, said lock bar having a portion adjacent the free end thereof for frictionally engaging said one of said trailing arms and maintaining the lock bar on said one of said trailing arms when the lock bar is in the stored position, said portion being movable out of frictional engagement with said one of said trailing arms into frictional engagement with the other of said trailing arms for preventing relative movement thereof when said lock bar is in said extended position.

4. A three wheel cambering vehicle having a longitudinally extending roll axis comprising a steering frame, an elongated steering shaft mounted for turning movement in said steering frame, a steerable front wheel rotatably connected to the lower end of said steering shaft, a handlebar assembly operatively connected to the upper end of said steering shaft, said steering frame further comprising a pair of elongated trailing arms extending rearwardly from said steering frame, laterally spaced rear wheels rotatably connected to end portions of said trailing arms, foot support means for an operator of the vehicle mounted on each of said trailing arms adjacent to each of said rear wheels, pivot means swingably mounting said trailing arms to said steering frame on an axis extending laterally thereof to permit said rear wheels to swing in separate planes allowing the operator to roll said vehicle with respect to said roll axis, a cambering device interconnecting said trailing arms so as to cause the latter to move through equal amounts in opposite directions so that the rear contact means camber by an amount equal to vehicle roll, and a channel-shaped lock bar connected at one end to one of said trailing arms for pivotal movement about a vertical axis and having a pair of tab portions at the other end that are movable out of frictional engagement with said one of said trailing arms into contact with a support surface for maintaining the vehicle in a parked condition, said tab portions adapted to be selectively moved into frictional engagement with the other of said trailing arms for preventing relative movement thereof.

* * * * *